US008924042B2

(12) United States Patent
Kim et al.

(10) Patent No.: US 8,924,042 B2
(45) Date of Patent: Dec. 30, 2014

(54) ROBOT CLEANER, AND REMOTE MONITORING SYSTEM AND METHOD OF THE SAME

(75) Inventors: Yiebin Kim, Changwon (KR); Kyungmin Lee, Changwon (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/444,026

(22) Filed: Apr. 11, 2012

(65) Prior Publication Data

US 2012/0265370 A1 Oct. 18, 2012

(30) Foreign Application Priority Data

Apr. 12, 2011 (KR) .................. 10-2011-0033930

(51) Int. Cl.
| | |
|---|---|
| *G05D 1/00* | (2006.01) |
| *G05D 3/00* | (2006.01) |
| *G06F 7/00* | (2006.01) |
| *G06F 17/00* | (2006.01) |
| *G07C 5/00* | (2006.01) |
| *G07C 5/08* | (2006.01) |
| *G05D 1/02* | (2006.01) |
| *H04L 12/58* | (2006.01) |

(52) U.S. Cl.
CPC .............. *G05D 1/0016* (2013.01); *G07C 5/008* (2013.01); *G07C 5/0841* (2013.01); *G05D 1/0022* (2013.01); *G05D 1/0246* (2013.01); *G05D 1/0255* (2013.01); *G05D 1/0274* (2013.01); *G05D 2201/0203* (2013.01); *H04L 51/32* (2013.01)
USPC ................................ 701/2; 701/23; 701/29.1

(58) Field of Classification Search
CPC . G05D 1/0022; G05D 1/0016; G05D 1/0246; G05D 1/0255; G05D 1/0274; G05D 220/0203; G07C 5/008; G07C 5/0841; H04L 51/32
USPC .............................................. 701/2, 23, 29.1
See application file for complete search history.

(56) References Cited

U.S. PATENT DOCUMENTS

| | | | | |
|---|---|---|---|---|
| 6,799,086 | B2 * | 9/2004 | Toki ............................ | 700/245 |
| 6,904,334 | B2 * | 6/2005 | Asano et al. ................. | 700/245 |
| 7,218,993 | B2 * | 5/2007 | Yasukawa et al. ............ | 700/245 |

(Continued)

FOREIGN PATENT DOCUMENTS

| | | |
|---|---|---|
| GB | 2 419 687 A | 5/2006 |
| JP | 2002085305 A | 3/2002 |

(Continued)

OTHER PUBLICATIONS

European Search Report dated Jul. 9, 2013.

*Primary Examiner* — Calvin Cheung
*Assistant Examiner* — Paula L Schneider
(74) *Attorney, Agent, or Firm* — Ked & Associates, LLP (57) ABSTRACT

A robot cleaner having a network function is capable of informing information on its internal and external states, through a network service, on a time desired by a user, or periodically, or whenever an event occurs. A remote monitoring system and method of a robot cleaner are capable of allowing a network service user to check state information of the robot cleaner real-time or when necessary, under a configuration that a robot cleaner provides state information such as a cleaning state, the occurrence of an unexpected accident, and an internal state of the robot cleaner, through a network service, by accessing a network server.

16 Claims, 6 Drawing Sheets

(56) References Cited

U.S. PATENT DOCUMENTS

| | | | |
|---|---|---|---|
| 2005/0204505 A1* | 9/2005 | Kashiwagi | 15/319 |
| 2006/0095158 A1* | 5/2006 | Lee et al. | 700/245 |
| 2007/0100500 A1* | 5/2007 | Abramson et al. | 700/245 |
| 2011/0004342 A1* | 1/2011 | Knopow et al. | 700/253 |
| 2011/0292193 A1* | 12/2011 | Wang et al. | 348/61 |
| 2012/0215380 A1* | 8/2012 | Fouillade et al. | 701/2 |
| 2012/0313779 A1* | 12/2012 | Papaefstathiou et al. | 340/540 |

FOREIGN PATENT DOCUMENTS

| | | |
|---|---|---|
| JP | 2005118354 A | 5/2005 |
| KR | 1020020080895 A | 10/2002 |
| KR | 1020110018211 A | 2/2011 |
| WO | WO 2009/083319 A1 | 7/2009 |

* cited by examiner

ROBOT CLEANER, AND REMOTE MONITORING SYSTEM AND METHOD OF THE SAME

CROSS-REFERENCE TO RELATED APPLICATION

This application claims the benefit of Korean Patent Application No. 10-2011-0033930, filed on Apr. 12, 2011, which is hereby incorporated by reference for all purposes as if fully set forth herein.

BACKGROUND OF THE DISCLOSURE

1. Field of the Disclosure

The present disclosure relates to a robot cleaner, and more particularly, to a robot cleaner having a networking function to inform information on its internal and external states to a user through a network service, and a remote monitoring system and method of the same.

2. Background of the Disclosure

Generally, a robot has been developed for an industrial use, and has managed some parts of factory automation. As the robot is applied to various fields recently, medical robots, space robots, home robots used at homes, etc. are being developed.

A representative of the home robots is a robot cleaner, a kind of home electronic appliance capable of performing a cleaning operation by sucking peripheral dust particles or foreign materials with autonomously moving on a predetermined region. This robot cleaner is provided with a chargeable battery, and is provided with an obstacle sensor for avoiding an obstacle while moving.

In the conventional robot cleaner, a cleaning operation may be performed when a user goes out or on a reserved time. However, when the cleaning operation has not been completed due to a problem occurring during the cleaning operation, or when the cleaning operation has been completed, the user has to directly check the situations through the robot cleaner. Recently, a robot cleaner having a network function is being developed. Through this robot cleaner, a user may provide a cleaning command from a remote location, or may monitor home situations from a remote location.

SUMMARY OF THE DISCLOSURE

Therefore, an aspect of the detailed description is to provide a robot cleaner having a network function, capable of informing information on its internal or external state, through a network service, on a time point desired by a user, or periodically, or whenever an event occurs.

Another aspect of the detailed description is to provide a remote monitoring system and method of a robot cleaner, capable of allowing a network service user to check state information of the robot cleaner real-time or when necessary, under a configuration that a robot cleaner provides state information such as a cleaning state, the occurrence of an unexpected accident and an internal state of the robot cleaner, through a network service, by accessing a network server.

To achieve these and other advantages and in accordance with the purpose of this specification, as embodied and broadly described herein, there is provided a robot cleaner, the robot cleaner comprising: a state detection unit configured to detect one or more information on internal and external states of the robot cleaner by using one or more sensors; a controller configured to create contents for a network service based on the one or more state information; and a communication unit connected to a network server, and configured to transmit the contents to the network server.

The robot cleaner may further comprise a storage unit configured to store access information accessible to the network server.

To achieve these and other advantages and in accordance with the purpose of this specification, as embodied and broadly described herein, there is also provided a remote monitoring method of a robot cleaner, the method comprising: detecting one or more information on internal and external states of the robot cleaner; creating contents for a network service based on the one or more state information; accessing a network server; and transmitting the contents to the network server.

To achieve these and other advantages and in accordance with the purpose of this specification, as embodied and broadly described herein, there is still also provided a remote monitoring system of a robot cleaner, the system comprising: a robot cleaner configured to create contents for a network service based on one or more state information, and to share the contents through the network service; and a terminal device configured to receive the contents through the network service.

The remote monitoring system of a robot cleaner may further comprise a network server configured to provide the network service.

The terminal device may include a control module configured to create a control command for controlling the robot cleaner by executing a remote control program; a communication module configured to receive the contents with respect to the state information, and to transmit the control command to the robot cleaner; and a user interface module configured to display the contents, and to receive the control command.

The present disclosure may have the following advantages.

Firstly, the robot cleaner may inform a user of its state information through a network service, real-time, or on a preset time, or on a time point desired by the user. This may enhance a user's convenience.

Secondly, a user may real-time monitor a state of the robot cleaner. This may allow the user to prevent a mal-function of the robot cleaner, and enhance stability of the system.

Thirdly, the robot cleaner may provide state information, such as a cleaning state, the occurrence of an unexpected accident, and an internal state of the robot cleaner, through a network service, by accessing a network server. This may allow a network service user to check the state information of the robot cleaner real-time or when necessary.

Fourthly, a network service user may remotely monitor and control the robot cleaner based on state information. This may enhance operational efficiency.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings.

DETAILED DESCRIPTION OF THE DISCLOSURE

Description will now be given in detail of the exemplary embodiments, with reference to the accompanying drawings. For the sake of brief description with reference to the drawings, the same or equivalent components will be provided with the same reference numbers, and description thereof will not be repeated.

Figure 1:
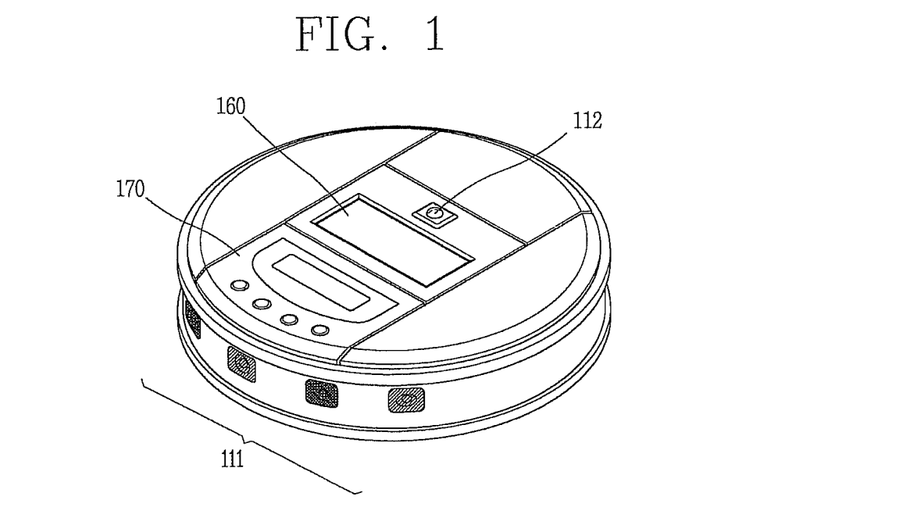
FIG. 1 is a perspective view showing the appearance of a robot cleaner according to one embodiment of the present disclosure.
Figure 3:
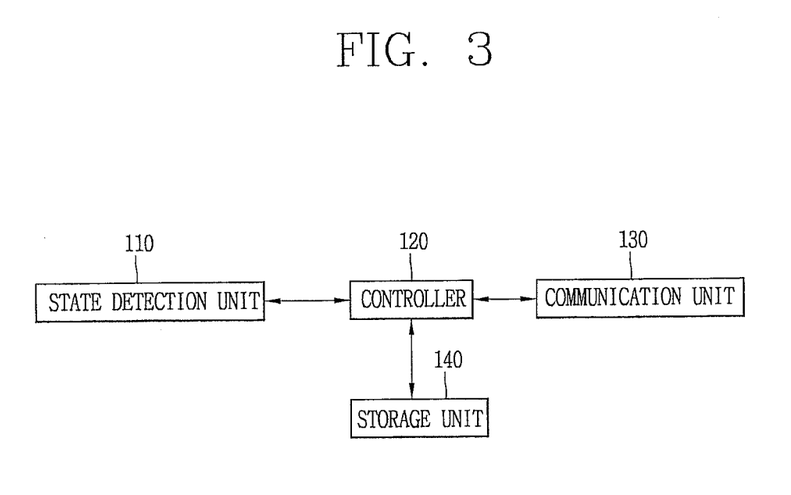
FIG. 3 is a block diagram schematically showing a configuration of a robot is cleaner according to one embodiment of the present disclosure.

Referring to FIGS. 1 and 3, a robot cleaner according to one embodiment of the present disclosure comprises a state detection unit 110, a controller 120, and a communication unit 130. The state detection unit 110 is configured to detect one or more information on internal and external states of the robot cleaner by using one or more sensors. The controller 120 is configured to create contents for a network service based on the one or more state information detected by the state detection unit 110. And, the communication unit 130 accesses a network server, and is configured to transmit the contents created by the controller to the network server.

The network service includes one or more services among a message, a bulletin board, an e-mail, a web site and a social network. As an example, referring to FIG. 6, the robot cleaner detects state information, and transmits the state information to a smart phone, one of terminal devices, through contents by a message service, i.e., 'message'. The message service includes a short message service (SMS), an enhanced messaging service (EMS), and a multimedia messaging service (MMS). The message service may be used to transmit not only a text, but also simple media such as a bell sound, an image and an animation. The message service may be implemented by combination of various media including single media and multimedia. Referring to FIG. 7, the robot cleaner detects state information, and transmits the state information to a smart phone by Twitter, one of social network services (SNS). The social network service includes a cyber bulletin board service provided from an internet café (cybercafé), and is called Cyworld, Myspace, Facebook, Twitter, etc.

The state detection unit 110 includes an obstacle detection unit 111 configured to detect an obstacle by searching for a cleaning region. And, the state detection unit 110 includes an image detection unit 112 installed at the upper side or the front side of a body, and configured to detect image information by capturing the periphery. The state information includes one or more external state information on intrusion detection, fire alarm, a cleaning map and a cleaning region. The state information includes one or more internal state information on cleaning performance, an error during cleaning performance, a mal-function, a power source and a dust box. The state detection unit 110 may be provided with a sensor for sensing specific materials, an electrode sensor, etc, and may be configured to detect contaminants included in the air, a contaminant degree of the floor, etc.

The obstacle detection unit 111 is configured to detect an obstacle near the robot cleaner while moving in a cleaning region, or while performing a cleaning operation. The obstacle detection unit 111 is configured to output, to the controller 120, information on whether an obstacle exists or not or information on the position, the size, etc. of the obstacle. The obstacle detection unit 111 may be implemented as an infrared ray sensor, an ultrasonic sensor, a radio frequency (RF) sensor, a bumper, etc. The controller 120 may be configured to create a cleaning map based on information on an obstacle detected by the obstacle detection unit 111.

The image detection unit 112 is installed toward the upper side or the front side, and is configured to capture image information by capturing the periphery of the robot cleaner. When the robot cleaner is provided with a plurality of cameras as the image detection unit, the cameras may be formed on the upper or side part of the robot cleaner at a constant interval therebetween, or at a constant angle therebetween. The image detection unit may include a monitoring camera to consecutively provide monitoring images. More specifically, the image detection unit may provide position recognition information, and may detect change of the peripheral situations such as the occurrence of fire or intrusion based on a comparison result among a plurality of monitoring images. The robot cleaner may further include a lens connected to a camera and focusing the camera on a subject, a camera controller configured to control the camera, and a lens controller configured to control the lens. As the lens, preferably used is a lens having a wide is view angle so that all the peripheral regions (e.g., all the regions on the ceiling) may be captured at a predetermined position, e.g., when the camera is toward the upper side. For instance, the lens is implemented as a lens having a view angle more than a predetermined angle, 160°. The controller 120 may be configured to make a cleaning map based on obstacle information and a position of the robot cleaner.

The controller 120 is configured to create contents by converting a protocol, etc. of state information detected by the state detection unit 110 in correspondence to a network service. For instance, in case of using a message service, the controller 120 creates contents in the form of SMS, EMS and MMS. In case of using a social network service, the controller 120 creates contents in the form of a bulletin board.

The controller 120 creates a cleaning map in a wall surface search manner, or in a cell division manner, etc., by searching for a cleaning region, i.e., while running or performing a cleaning operation. Explanations about a detailed algorithm to create a cleaning map will be omitted. When creating a cleaning map, the controller 120 may utilize a position, a size, etc. of an obstacle or a structure inside a cleaning region. The controller may create a cleaning map based on a position, etc. of the robot cleaner. Alternatively, the controller may create a cleaning map based on a substantial map. The cleaning map may include position information. The controller may create contents for a network service on a preset time, e.g., in a time period of one hour. Alternatively, the controller may create contents for a network service when state information occurs (when an event occurs), or when contents is requested from a user, etc. The controller transmits the created contents to an external server or a user, etc. by driving the communication unit.

The communication unit 130 accesses a network server which provides a network service through wired or wireless internet, and transmits state information to the network server. That is, the communication unit may provide state information to a user, etc. through a network service in the form of contents. The communication unit 130 may be connected to an external device, by one of communication methods including a wired method, a wireless method, and a satellite communication method. The communication unit 130 may perform short-range communication by using one of radio frequency (RF) communication, Bluetooth, infrared ray communication, LAN and Zigbee. In this case, the communication unit 130 may directly transit a cleaning map, state information, etc., to an external device. Here, the transmission may be performed on a preset time, or a time desired by a user, or a time when new state information occurs or changes, etc.

Referring to FIG. 3, the robot cleaner according to one embodiment of the present disclosure further comprises a storage unit 140 configured to store therein access information accessible to the network server. The network service is configured to pre-register an ID, a password, etc., through a subscription procedure. That is, the storage unit 140 is configured to store therein access information accessible to the network server, and to store a user or a to manufacturing company, etc. to which the state information is to be transmitted.

The storage unit 140 is configured to store therein a control algorithm for driving the robot cleaner. The storage unit 140 may store therein obstacle information, position information, a cleaning region, a cleaning map, state information, etc. As the storage unit 140, a non-volatile memory is mainly used. The NVM indicates a storage device capable of maintaining stored information even if power is not supplied thereto. The NVM includes ROM, flash memory, a magnetic computer memory device (e.g., a hard disk, a diskette drive, and a magnetic tape), an optical drive, magnetic RAM, PRAM, etc.

Figure 5:
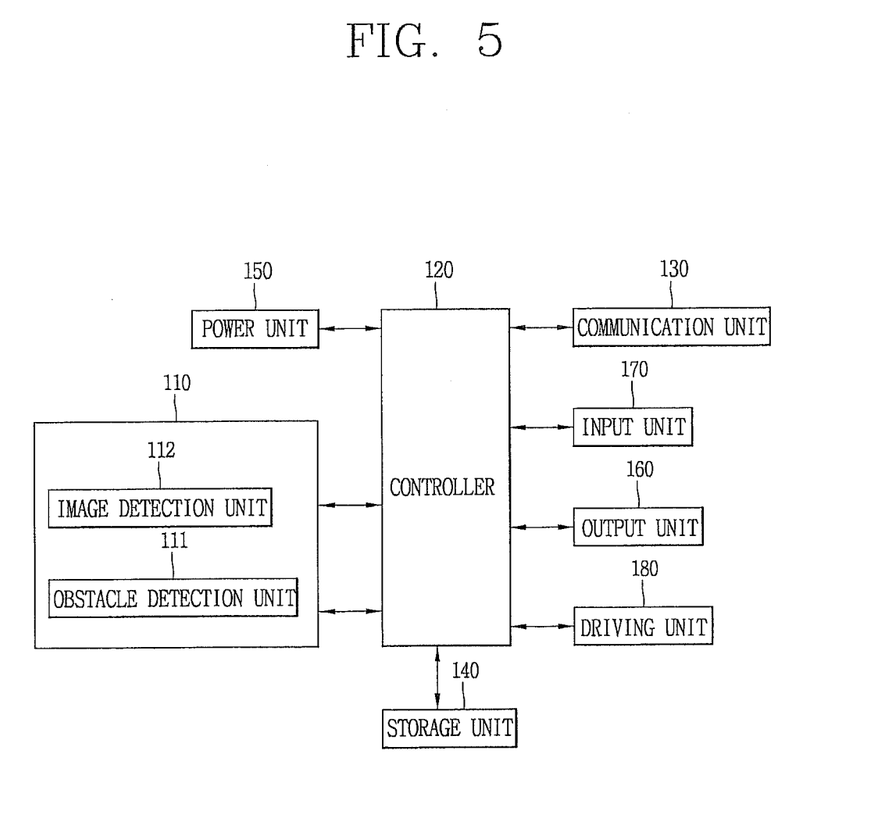
FIG. 5 is a block diagram schematically showing a configuration of a robot cleaner according to another embodiment of the present disclosure.

Referring to FIG. 5, a robot cleaner according to another embodiment of the present disclosure comprises a state detection unit 110, a controller 120, a communication unit 130, a storage unit 140, a power unit 150, an output unit 160, an input unit 170, and a driving unit 180.

Referring to FIG. 5, the output unit 160 is configured to display, on a screen, internal state information of the robot cleaner detected by the state detection unit 110, e.g., a current state of each unit of the robot cleaner, a current cleaning state and a peripheral state. The output unit 160 may be implemented as one of a light emitting diode (LED), a liquid crystal display (LCD), a plasma display panel (PDP), and an organic light emitting diode (OLED).

A user directly inputs a control command to the robot cleaner through the input unit 170. Alternatively, the user may input, through the input unit, a command instructing output of one or more information of the robot cleaner. The input unit 170 is provided with an OK button, a set button, etc. The OK button is used to input a command for certifying sensing information, obstacle information, position information, a cleaning region, a cleaning map, and a current state. The set button is used to input a command for setting the information. The input unit may be provided with a reset button for inputting a command for resetting the information, a deletion button, a cleaning start button, a stop button, etc. Each of the input unit 170 and the output unit 160 may be implemented in the form of a touch screen for implementation of input and output.

The power unit 150 is provided with chargeable power supply means to supply power into the robot cleaner. The power unit 150 supplies an operation power required when the robot cleaner moves or performs a cleaning operation. When the remaining amount of the power unit 150 is deficient, the robot cleaner moves to a charging base to supply a charging current to the power unit 150.

The driving unit 180 is connected to a plurality of main wheels and one or more auxiliary wheels. The driving unit is provided with a wheel motor for rotating the wheels, and moves the robot cleaner by driving the wheel motor.

The robot cleaner may further comprise a cleaning unit (not shown). The cleaning unit is provided with a suction motor for sucking the air and a means for collecting dust, and is configured to suck peripheral dust or foreign materials.

Figure 2:
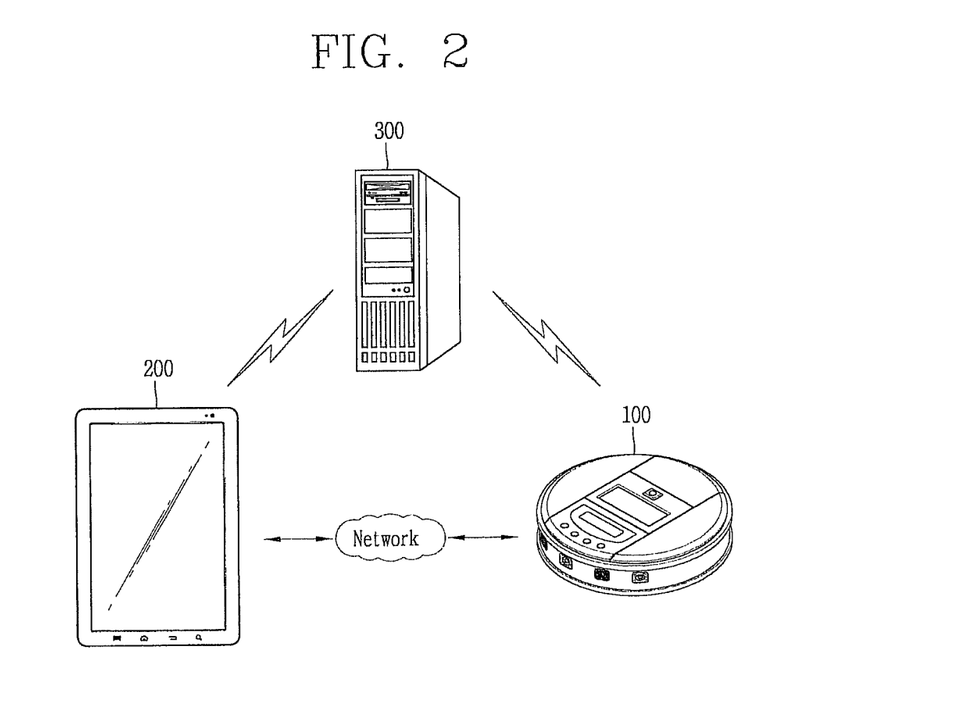
FIG. 2 is a view schematically showing a configuration of a remote monitoring system of a robot cleaner according to one embodiment of the present disclosure.

Referring to FIG. 2, a remote monitoring system of a robot cleaner according to one embodiment of the present disclosure comprises a robot cleaner 100 and a terminal device 200. The robot cleaner 100 is configured to create contents for a network service based on one or more state information, and to share the contents through the network service. The terminal device 200 is configured to receive the contents shared by the robot cleaner through the network service.

A remote monitoring system of a robot cleaner according to another embodiment of the present disclosure comprises a robot cleaner 100, a terminal to device 200, and a network server 300. The robot cleaner 100 is configured to create contents for a network service based on one or more state information, and to share the contents through the network service. The terminal device 200 is configured to receive the contents through the network service. And, the network server 300 is configured to provide the network service. The robot cleaner may be understood with reference to FIGS. 1, 3 and 5, and detailed explanations thereof will be omitted.

Figure 4:
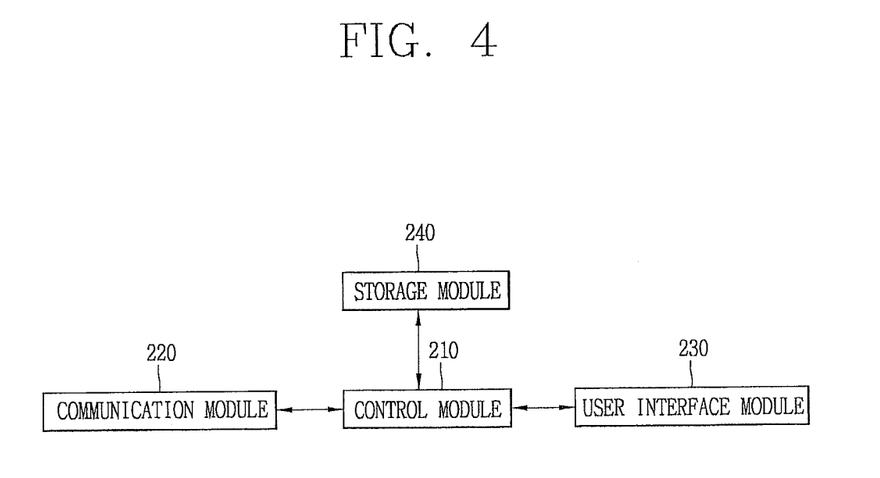
FIG. 4 is a block diagram showing one example of a terminal device of FIG. 2.

Referring to FIG. 4, the terminal device 200 includes a control module 210, a communication module 220, and a user interface module 230. The control module 210 is configured to create a control command for controlling the robot cleaner by executing a remote control program. The communication module 220 is configured to receive the contents with respect to the state information, and to transmit the control command to the robot cleaner. The communication module 220 allows the terminal device to access a server (network server) which provides the contents on the Internet. The communication module 220 may be directly connected to the robot cleaner 100, by one of communication methods including a wired method, a wireless method, and a satellite communication method. The user interface module 230 is configured to display the contents, and to receive the control command. The terminal device 200 further includes a storage module 240 configured to store therein the remote control program and the contents. The terminal device 200 is connected to the robot cleaner and the network server, by communication means such as a computer, a smart television, a smart phone and a portable phone. Especially, the terminal device 200 indicates a device connected to the network server through the Internet.

Figure 6:
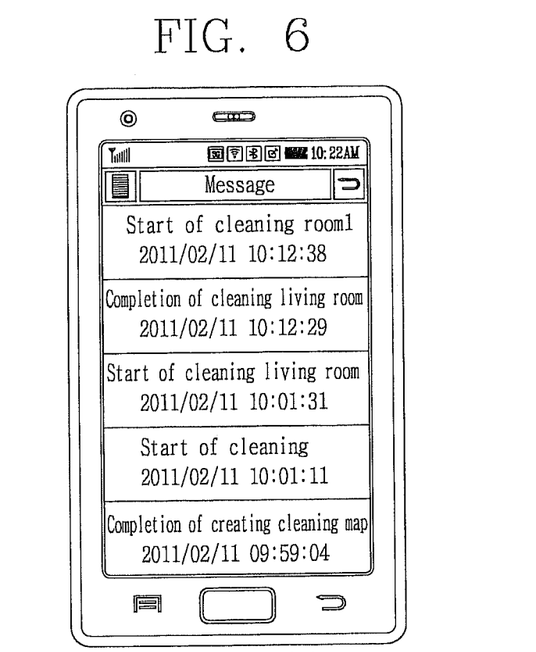
FIG. 6 is a view for explaining an operation to share state information of a robot cleaner through a message service according to the present disclosure.
Figure 7:
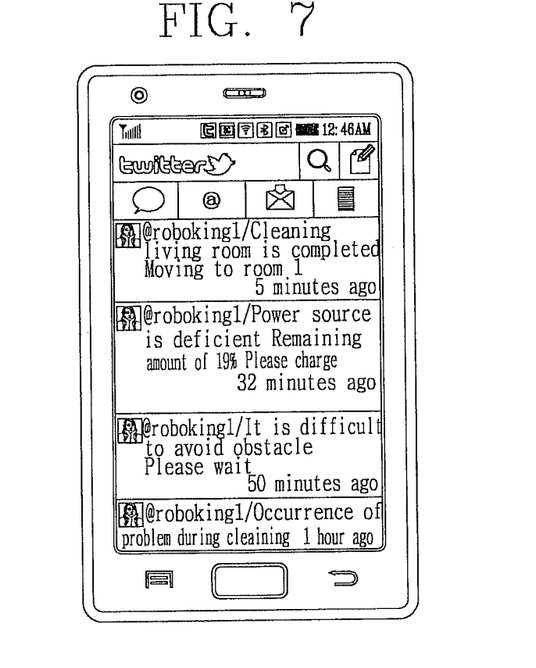
FIG. 7 is a view for explaining an operation to share state information of a robot cleaner through a social network service according to the present disclosure.

FIG. 6 shows an example in which a smart phone, one of terminal devices receives state information of the robot cleaner in the form of a message, i.e., contents for a message service. The robot cleaner detects state information, and creates a message including the state information. Then, the robot cleaner transmits the message to the terminal device by accessing a network server which provides a message service.

Then, the terminal device receives the message including the state information from the network server. FIG. 7 shows an example in which a smart phone receives state information of the robot cleaner by Twitter. Once the robot cleaner detects state information and transmits the state information to an SNS server by Twitter, one of social network services, the smart phone receives contents with respect to the state information from the SNS server.

Figure 8:
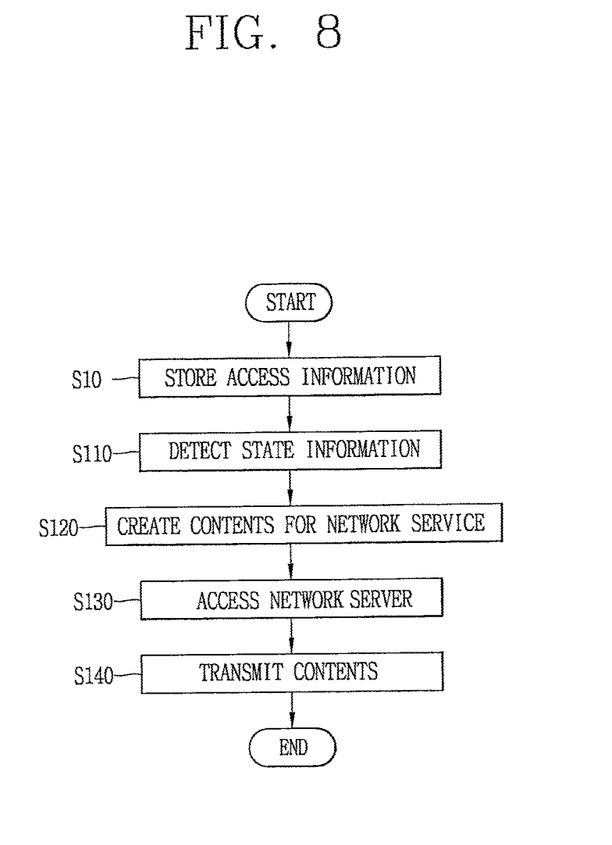
FIGS. 8 and 9 are flowcharts schematically showing a remote monitoring method of a robot cleaner according to the present disclosure.

Referring to FIG. 8, a remote monitoring method of a robot cleaner according to one embodiment of the present disclosure comprises detecting one or more information on internal and external states of the robot cleaner (S110), creating contents for a network service based on the one or more state information (S120), accessing a network server (S130), and transmitting the contents to the network server (S140). The network service includes one or more services among a message, a bulletin board, an e-mail, a web site and a social network. The robot cleaner creates contents by converting a protocol, etc. of state information in correspondence to a network service. For instance, in case of using a message service, the robot cleaner creates contents in the form of SMS, EMS and MMS. In case of using a social network service, the robot cleaner creates contents in the form of a bulletin board.

The remote monitoring method of a robot cleaner according to one embodiment of the present disclosure further comprises storing access information accessible to the network server. The network service is configured to pre-register an ID, a password, etc., through a subscription procedure. That is, the robot cleaner is configured to pre-store therein access information accessible to the network server, and/or a user or a manufacturing company, etc. to which the state information is to be transmitted.

The state information includes one or more external state information on intrusion detection, fire alarm, a cleaning map and a cleaning region, or includes one or more internal state information on cleaning performance, an error during cleaning performance, a mal-function, a power source and a dust box. The state information may include contaminants included in the air, a contaminant degree of the floor, etc.

Figure 9:
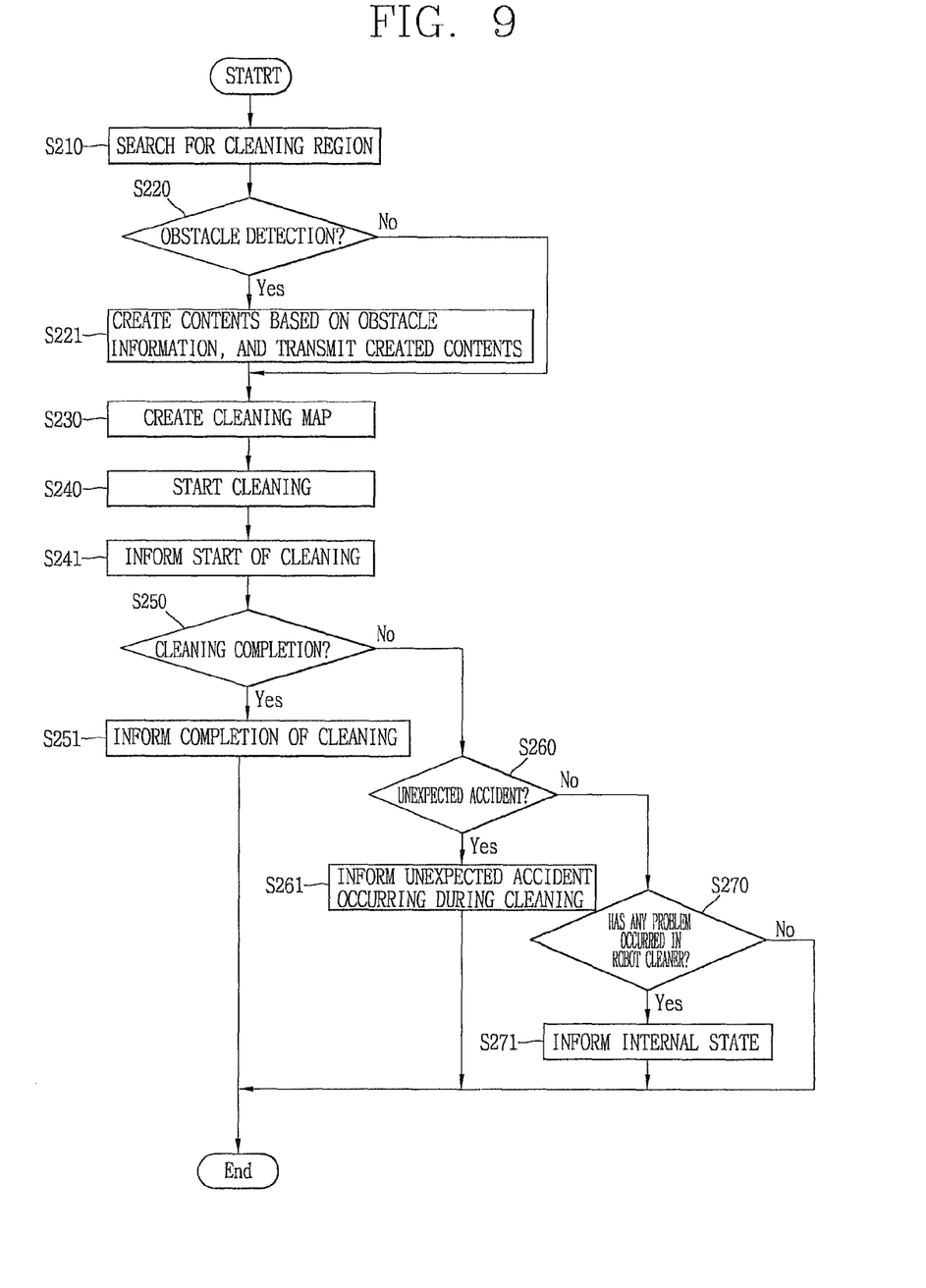

FIG. 9 is a view showing a remote monitoring method of a robot cleaner according to another embodiment of the present disclosure. The step of detecting one or more information on internal and external states of the robot cleaner of FIG. 8 includes searching for a cleaning region (S210), and detecting a peripheral obstacle within the cleaning region (S220). And, the step of detecting one or more information on internal and external states of the robot cleaner includes creating a cleaning map based on the obstacle information (S230). The robot cleaner is configured to detect a peripheral obstacle while moving in a cleaning region, or while performing a cleaning operation (S220). The robot cleaner creates contents based on obstacle information, such as information on whether an obstacle exists or not or information on the position, the size, etc. of the obstacle. Alternatively, the robot cleaner creates contents based on a cleaning map created based on the obstacle information, a cleaning state, and information on a cause, a time, etc. of stopping of cleaning. And, the step of detecting one or more information on internal and external states of the robot cleaner includes detecting image information by capturing the periphery (not shown), detecting change of the image information (S260), and determining that an unexpected accident has occurred when a change amount is more than a reference value (S261). The robot cleaner captures the periphery to obtain image information, and detects state information on intrusion detection, fire alarm, a cleaning map and a cleaning region. Then, the robot cleaner creates contents based on the detected state information, and transmits the contents to a network server or a terminal device.

Once a cleaning operation is started or completed (S240, S250), the robot cleaner creates contents based on information on the start or completion and transmits the contents to a network server or a terminal device. Referring to FIG. 6 or 7, the robot cleaner transmits contents together with visual information, to the terminal device through a message service or a social network service. Here, the contents include messages such as "Cleaning start", "Living room cleaning start", "Living room cleaning completion", "Cleaning completion".

As aforementioned, the robot cleaner may real-time inform a user of its internal and external state information, through a network service such as SNS. The user may real-time monitor a state of the robot cleaner through the network service. That is, in the present disclosure, the robot cleaner provides state information such as a cleaning state, the occurrence of an unexpected accident and an internal state of the robot cleaner, by accessing a network service. This may allow a user of the network service to check the state information of the robot cleaner real time or when necessary. Furthermore, the user of the network service may remotely monitor and control the robot cleaner based on the state information.

What is claimed is:

1. A robot cleaner, comprising:
   a state detection unit configured to detect one or more items of state information related to at least one of an internal or an external state of the robot cleaner using one or more sensors;
   a controller configured to receive the one or more items of state information, and to generate contents based on the received one or more items of state information while a cleaning operation is stopped during cleaning performance;
   a storage unit configured to store access information about an account of the robot cleaner; and
   a communication unit connected to a network server providing a web-based social network service using the access information, wherein the communication unit transmits the contents to an electronic bulletin board for the robot cleaner in the network server, wherein the contents are provided to a user via a terminal device gaining access to the web-based social network service in a sequence of time.

2. The robot cleaner of claim 1, wherein the state detection unit includes an obstacle detection unit configured to detect an obstacle by searching for a cleaning region.

3. The robot cleaner of claim 1, wherein the state detection unit includes an image detection unit installed at an upper side or a front side of a body of the robot cleaner, and wherein the image detection unit is configured to detect image information by capturing images of a periphery of the robot cleaner.

4. The robot cleaner of claim 1, wherein the communication unit receives a control command from the network server, wherein one of contents includes the control command and is posted on the cyber bulletin board by a user through a terminal device.

5. A method of monitoring a robot cleaner remotely, the robot cleaner including a state detection unit, a controller, a communication unit and a storage unit, the method comprising:
   detecting, by the state detection unit, one or more items of state information related to at least one of an internal state or an external state of the robot cleaner;
   creating, by the controller, contents comprising the one or more items of state information while a cleaning operation is stopped during cleaning performance;

accessing, by the communication unit, a network server providing a web-based social network service using an access information about an account of the robot cleaner;

transmitting, by the communication unit, the contents to an electronic bulletin board for the robot cleaner in the network server, wherein the contents are provided to a user via a terminal device gaining access to the web-based social network service in a sequence of time.

6. The method of claim 5, wherein the robot cleaner further comprises the storage unit configured to store the access information accessible to the network server.

7. The method of claim 5, wherein detecting one or more items of state information related to at least one of an internal state or an external state of the robot cleaner includes:

obtaining, by an image detection unit of the state detection unit of the robot cleaner, a plurality of monitoring images captured at a periphery of the robot cleaner;

comparing, by the controller, the plurality of monitoring images captured by the image detection unit; and determining, by the controller, that an unexpected accident has occurred based on a result of the comparison of the plurality of monitoring images.

8. The method of claim 5, wherein the communication unit receives a control command from the network server, wherein one of contents includes the control command and is posted on the cyber bulletin board by a user through a terminal device.

9. A remotely monitored robot cleaning system, the system comprising:

a robot cleaner configured to create contents comprising one or more items of state information related to at least one of an internal state or an external state of the robot cleaner while a cleaning operation is stopped during cleaning performance, and to share the contents through a web-based social network service by transmitting the contents to an electronic bulletin board for the robot cleaner in a network server providing the web-based network service; and a terminal device configured to gain access to the web-based social network service, to receive the contents through the web-based network service, and to provide the contents to a user in a sequence of time, wherein the robot cleaner connects to the network server providing the web-based social network service using access information about an account of the robot cleaner.

10. The system of claim 9, wherein the robot cleaner includes:

a state detection unit configured to detect the one or more items of state information using one or more sensors;

a controller configured to create the contents to be transmitted to the web-based network service based on the one or more items of state information; and a communication unit connected to the network server, and configured to transmit the contents to the network server.

11. The system of claim 10, further comprising a storage unit configured to store the access information accessible to the network server.

12. The system of claim 10, wherein the state detection unit includes an obstacle detection unit configured to detect an obstacle by searching for a cleaning region.

13. The system of claim 10, wherein the state detection unit includes an image detection unit installed at an upper side or a front side of a body, and configured to detect image information by capturing a periphery of the robot cleaner.

14. The system of claim 9, wherein the terminal device includes:

a control module configured to create a control command for controlling the robot cleaner by executing a remote control program;

a communication module configured to receive the contents created by the controller, and to transmit the control command created by the control module to the robot cleaner; and a user interface module configured to display the contents, and to receive the control command.

15. The system of claim 14, wherein the terminal device further includes a storage module configured to store therein the remote control program and the contents.

16. The system of claim 9, wherein the robot receives a control command from the network server, wherein one of contents includes the control command and is posted on the cyber bulletin board by a user through a terminal device.

* * * * *